(12) United States Patent
Chacin (10) Patent No.: US 11,199,855 B2
(45) Date of Patent: Dec. 14, 2021

(54) SYSTEM AND METHOD FOR LUBE COST CONTROL ON HEAVY MACHINERY

(71) Applicant: Lisandro Chacin, Maracaibo (VE)

(72) Inventor: Lisandro Chacin, Maracaibo (VE)

( * ) Notice: Subject to any disclaimer, the term of this patent is extended or adjusted under 35 U.S.C. 154(b) by 300 days.

(21) Appl. No.: 16/545,052

(22) Filed: Aug. 20, 2019

(65) Prior Publication Data

US 2021/0055743 A1 Feb. 25, 2021

(51) Int. Cl.
  *B67D 7/14* (2010.01)
  *G07C 5/08* (2006.01)
  *G05D 1/02* (2020.01)
  *G07C 5/00* (2006.01)

(52) U.S. Cl.
  CPC ........... *G05D 1/0287* (2013.01); *B67D 7/145* (2013.01); *G07C 5/006* (2013.01); *G07C 5/0808* (2013.01)

(58) Field of Classification Search
  CPC .... G05D 1/0287; G07C 5/0808; G07C 5/006; B67D 7/145
  See application file for complete search history.

(56) References Cited

U.S. PATENT DOCUMENTS

| 4,248,263 A | 2/1981 | Langill, Jr. et al. |
| 5,978,787 A | 11/1999 | WongStewart et al. |
| 6,411,986 B1 | 6/2002 | SusaiRajiv et al. |
| 6,950,871 B1 | 9/2005 | Honma et al. |
| 8,429,095 B1* | 4/2013 | Ryan ............ G06Q 50/06 705/413 |
| 2006/0174192 A1 | 8/2006 | Mortensen |
| 2009/0066480 A1 | 3/2009 | Jin-Hun et al. |
| 2010/0200609 A1* | 8/2010 | Cadigan ............ B67D 7/423 222/1 |
| 2012/0197460 A1* | 8/2012 | Seymour ............ G07F 15/04 701/1 |
| 2013/0299583 A1 | 11/2013 | Wilkinson |
| 2019/0105676 A1* | 4/2019 | Kahler ............ B67D 7/425 |

FOREIGN PATENT DOCUMENTS

| CA | 1325412 C | 12/1993 |
| EP | 1814059 A2 | 8/2007 |

* cited by examiner

*Primary Examiner* — Jason K Niesz
(74) *Attorney, Agent, or Firm* — Hoglund & Pamias, PSC; Roberto J. Rios (57) ABSTRACT

A system is provided for automatically reporting all the lubes delivered from the lube truck in the field and on the lube bay at the workshop in mining & related business. All the lubes dispensed from both sides need to be accounted for on each machine due to the high cost and volume. The system improves the actual lube process on mining environment avoiding human mistakes and creating a reliable lube report.

20 Claims, 8 Drawing Sheets

DATA COLLECTION

| | Data | Where the data comes from |
|---|---|---|
| 1 | Equipment number (TAG) | RFID |
| 2 | Lube type | RFID |
| 3 | Volume dispatched | Digital meter |
| 4 | Date | Data logger |
| 5 | Hour | Data logger |

Fig. 7

EXAMPLE OF LUBE REPORT

| N° | Equipment | Date | Hour | LUBRICANT TYPE | | | | | |
|---|---|---|---|---|---|---|---|---|---|
| | | | | Eng. Oil | Hyd. Oil | Transm. | FD Oil | Coolant | Grease |
| | | | | 15W40 | 68 | 50 W | SAE 60 | | |
| 1 | PE-06 | 26/02/2018 | 5:31 | 17 | 35 | 0 | 6 | 19 | 34 |
| 2 | PE-05 | 26/02/2018 | 5:45 | 14 | 21 | 0 | 0 | 10 | 18 |
| 3 | PE-02 | 26/02/2018 | 5:56 | 10 | 24 | 0 | 0 | 6 | 12 |
| 4 | DT-17 | 26/02/2018 | 5:52 | 9 | 19 | 12 | 20 | 0 | 5 |
| 5 | DT-10 | 26/02/2018 | 5:45 | 16 | 38 | 0 | 0 | 8 | 6 |
| 6 | DZ-07 | 26/02/2018 | 6:03 | 9 | 7 | 0 | 0 | 0 | 4 |
| 7 | GR-04 | 26/02/2018 | 6:16 | 5 | 6 | 0 | 0 | 0 | 3 |
| 8 | FL-16 | 26/02/2018 | 6:23 | 0 | 12 | | | 7 | 5 |
| 9 | DT-23 | 26/02/2018 | 6:34 | 0 | 22 | 12 | 0 | 0 | 4 |
| 10 | EX-10 | 26/02/2018 | 6:43 | 0 | 12 | 0 | 0 | 8 | 3 |

Fig. 8

SYSTEM AND METHOD FOR LUBE COST CONTROL ON HEAVY MACHINERY

FIELD OF THE INVENTION

The present invention relates to a system for automatically reporting the lubes volumes dispensed from the lube truck in a field and the lube bay at the workshop on heavy mining machinery and related business which are both controlled by the equipment number (TAG), lube type, lube volume, date & time. More specifically, this invention relates to a reliable lube report to be used on the lube cost control for mining and related business where an accurate lube cost control for their fleet is needed.

BACKGROUND OF THE INVENTION

In mining, one of the highest costs for heavy machinery are the lubricants representing 7 to 12% of the total maintenance budget. As used herein, "lube or lubricant" means any fluid used on heavy machines. Examples of lubes are engine oil, hydraulic oil, transmission oil, final drive & differential oil, synthetic oil, coolant, grease lubricant, etc.

Figure 1:
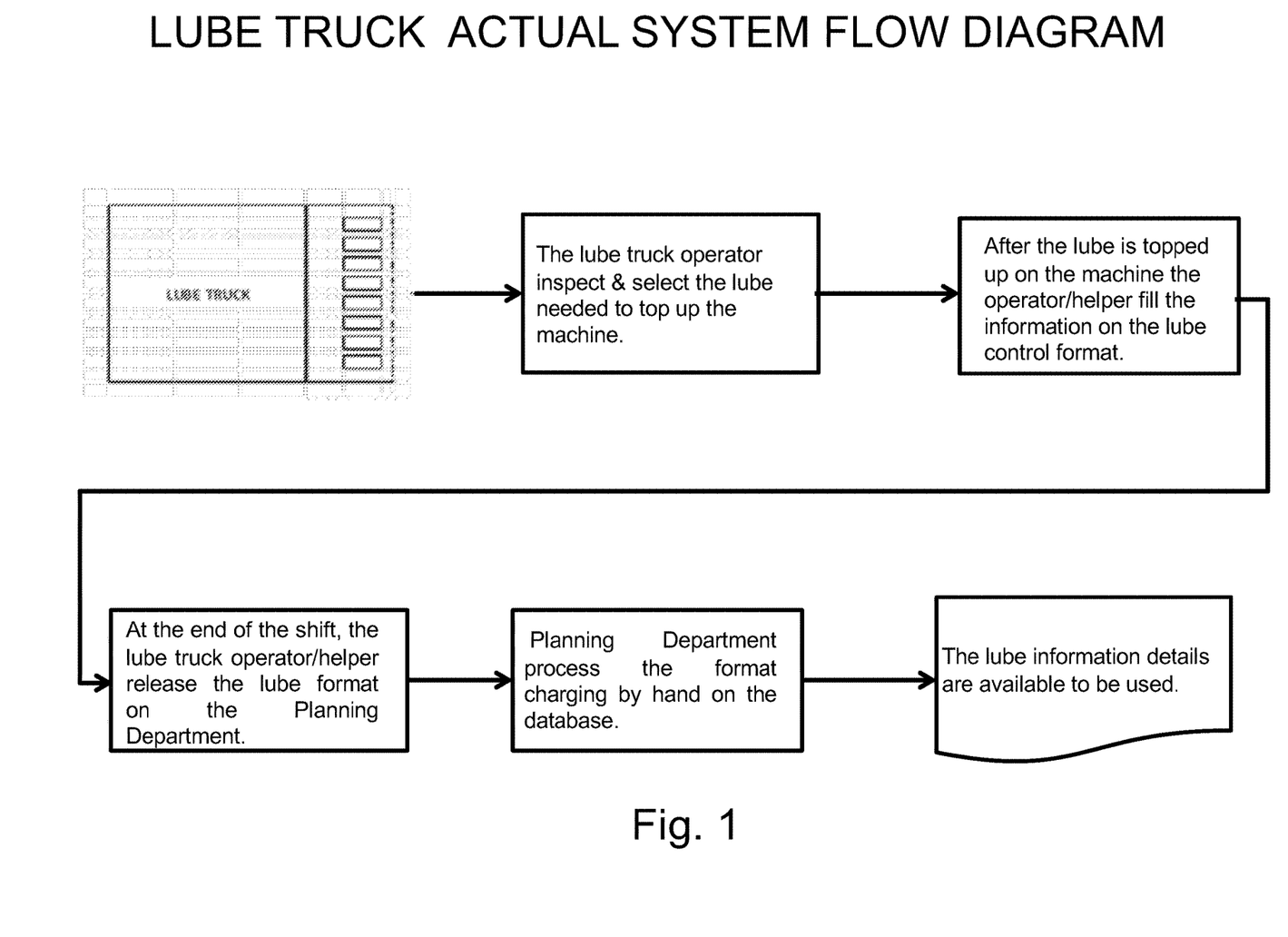
FIG. 1 shows a process flow of the actual system for a field lube truck.
Figure 2:
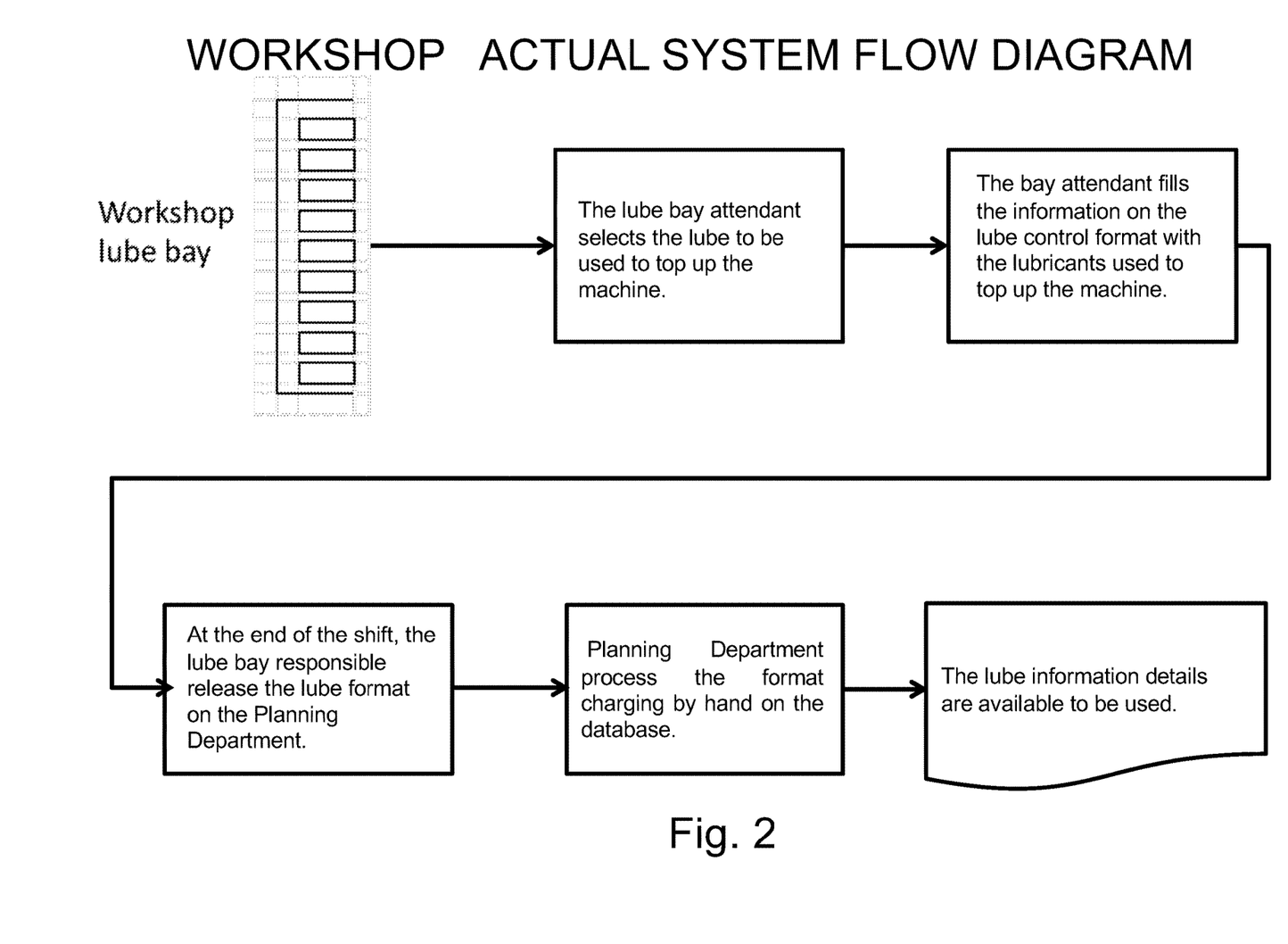
FIG. 2 shows a process flow of the actual system for a workshop lube bay.
Figure 3:
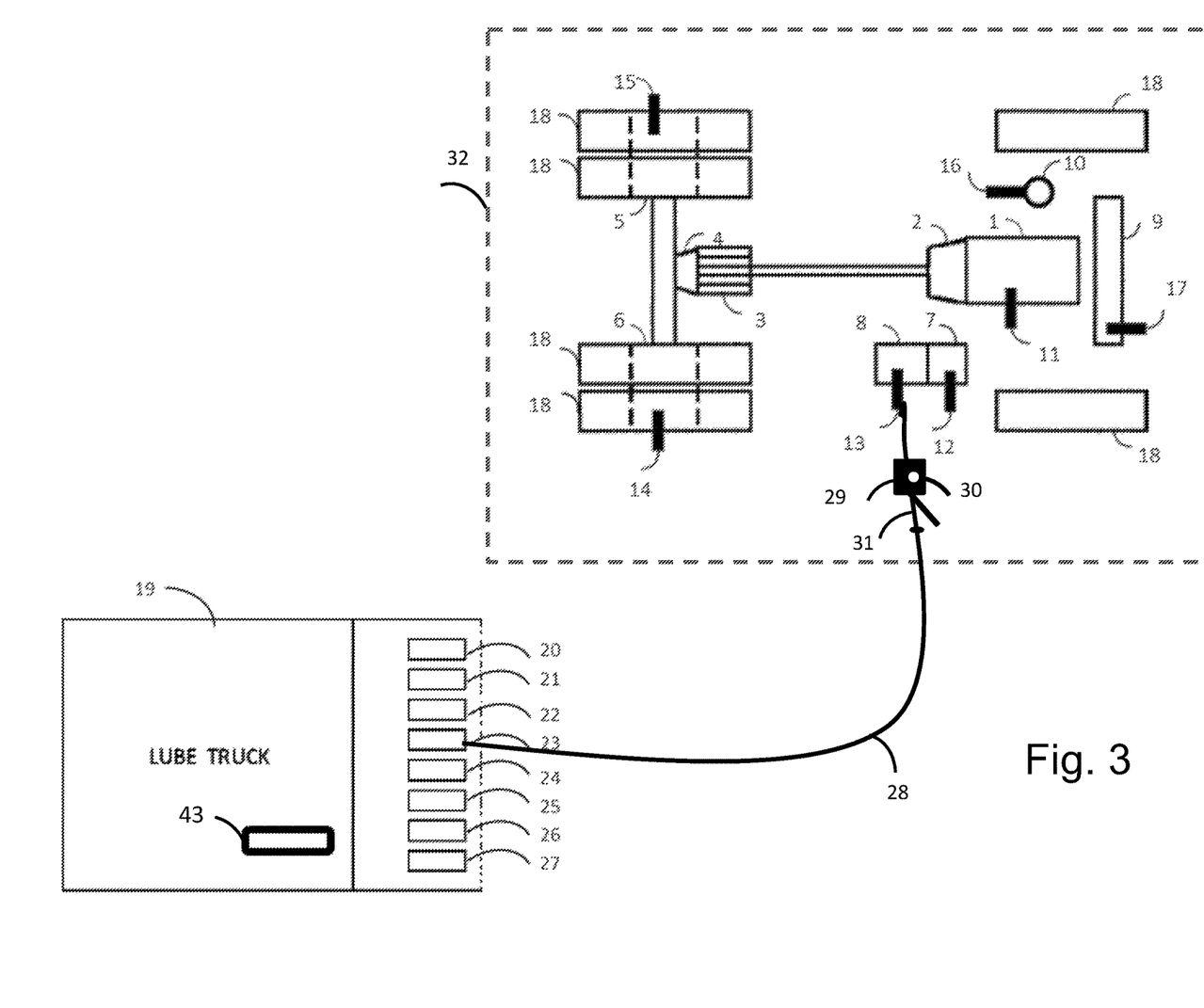
FIG. 3 illustrates a lube truck servicing a heavy machine in the field.

The actual process to control the dispensed lubricants is done by the lube truck operator/helper in the field (FIG. 1) and in the workshop by the lube bay attendant (FIG. 2). The process is manually recorded in a form and sometimes the information is inaccurate or missing, the form can get lost and the typographical errors can create confusion and misleading information.

Existing digital lube dispensers can be preset to deliver a defined volume of lubricant, but they don't detect the right lube ports, so the mix of different lubricants by human mistake is possible. Accordingly, the mixed lubes can be seen in the oil analysis report.

In mining, the massive amounts of lubricants need to be controlled because of the high cost and the process being different every day. The lube trucks are in the field serving the different machines type and brands with different lube types. The same situation happens at the workshop where the preventative and corrective maintenances varies from day to day and there are different machines with different lube needs. Then the lube consumption in every machine needs to be recorded free of human mistakes.

Accordingly, a system to manage all the dispensed lubes in the field by the lube truck and in the workshop at the lube bay is needed to make account for all the dispensed lubricants.

SUMMARY OF THE INVENTION

The present invention provides a Lube Cost Control System (LCCS) to be used in heavy mining machinery and other similar business both on the field and on the workshop.

According to an aspect of the invention, a Radio Frequency Identification (RFID) reader is installed inside the digital lube dispenser and a passive RFID is located on each lube port on the heavy machinery. Each passive RFID will provide the information about TAG number and lube type.

According to another aspect of the invention, a computer system having a storage area network and method of handling data in the computer system is provided so that the information of the lube dispensed will be sent from the digital lube dispenser to the data logger on the lube truck and once the lube truck is at the workshop then the information is sent from the data logger to the server. On the server the report will be generated and available as a spreadsheet or CSV file.

According to still another aspect of the invention, the system provides control of the costs of lubricants in detail per equipment, type, volume, day and hour.

According to yet another aspect of the invention, the system provides an accurate lubricant consumption paperless report for lubricant delivery without transcriptions and free of typographical mistakes.

According to one aspect of the invention, the system avoids mixing lubricants by mistake and assists in detecting an early stage of a future failure (Preventative Maintenance).

Another feature of the invention is no more missing lube control format.

Another feature of the invention is lube reports helps supply to track lubricant consumption to check and make up the inventory.

Another feature of the invention is to control of lube truck and lube bay crew time and works assigned.

BRIEF DESCRIPTION OF THE DRAWINGS

Further features and advantages of the invention will become apparent from the following detailed description taken in conjunction with the accompanying figures showing illustrative embodiments of the invention, in which.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

The following reference numbers will be used in to explain the invention in conjunction with the Figures.

1—Engine
2—Torque converter
3—Transmission
4—Differential
5—Left-hand final drive
6—Right-hand final drive
7—Torque converter & transmission tank
8—Hydraulic tank
9—Radiator
10—Grease tank
11—Engine RFID
12—Torque converter & transmission tank RFID 13—Hydraulic tank RFID
14—Left-hand final drive RFID
15—Right-hand final drive RFID
16—Grease tank RFID
17—Radiator RFID
18—Tire
19—Lube truck
20,21,22,23, 24, 25, 26, 27—Lube truck hose reel for lubricant
28—Lubricant hose
29—Digital lube meter
30—RFID readers inside the digital lube meter
31—Lube dispensers (Nozzle)
32—Heavy machinery sample plant view
34, 35, 36, 37, 38, 39,40, 41—Lube bay hose reel for lubricants
42—Workshop data logger
43—Lube truck data logger The present invention provides a system for automatically reporting a detailed lube consumption on heavy machinery and related business. The system is based on a passive RFID tag/device installed on each machine lube port (11, 12,13, 14,15, 16, 17) with the information of a machine number (TAG) and lube type used on each lube port.

Figure 4:
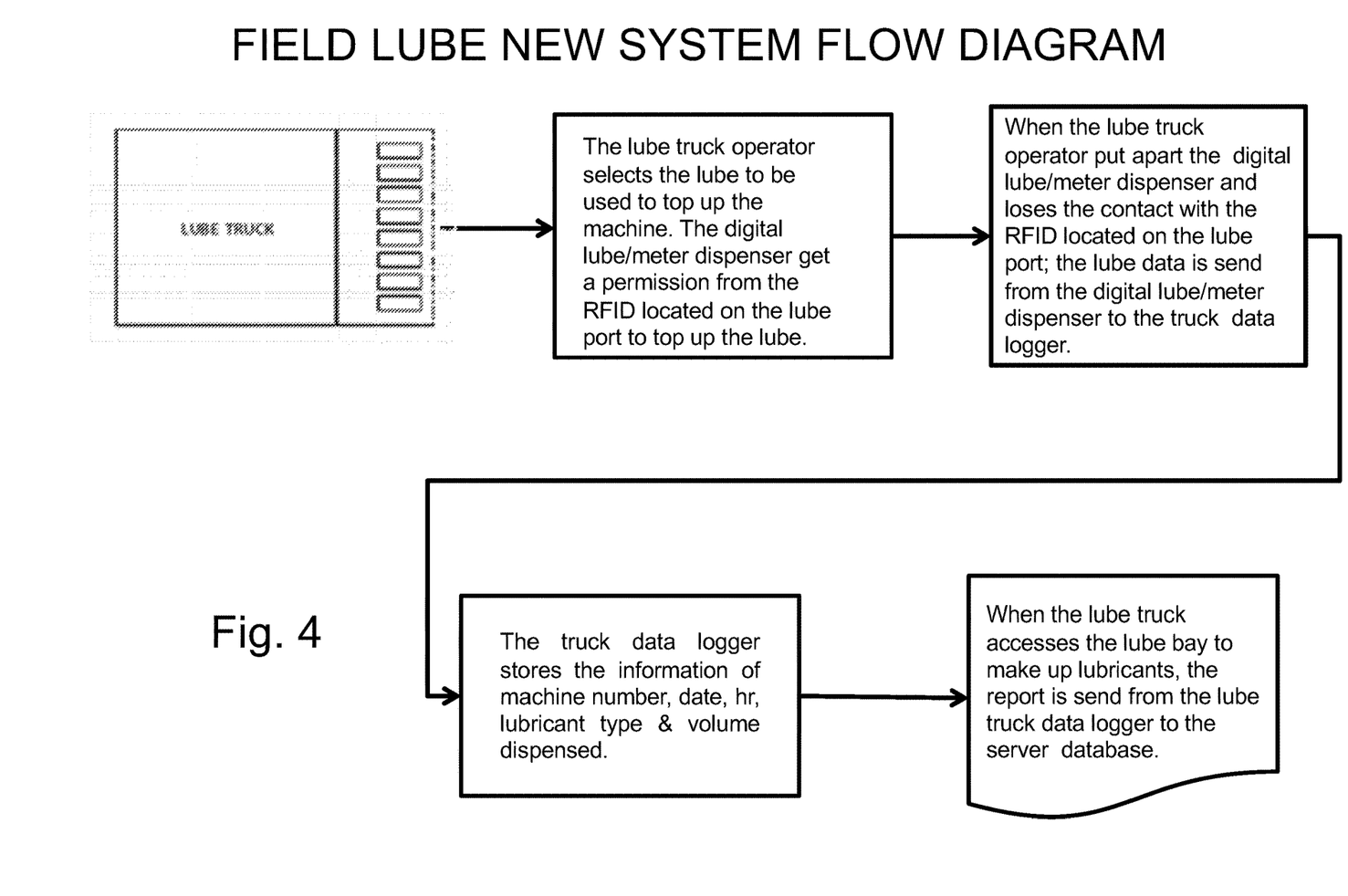
FIG. 4 shows a process flow for a lube truck using the system according to the present invention.
Figure 5:
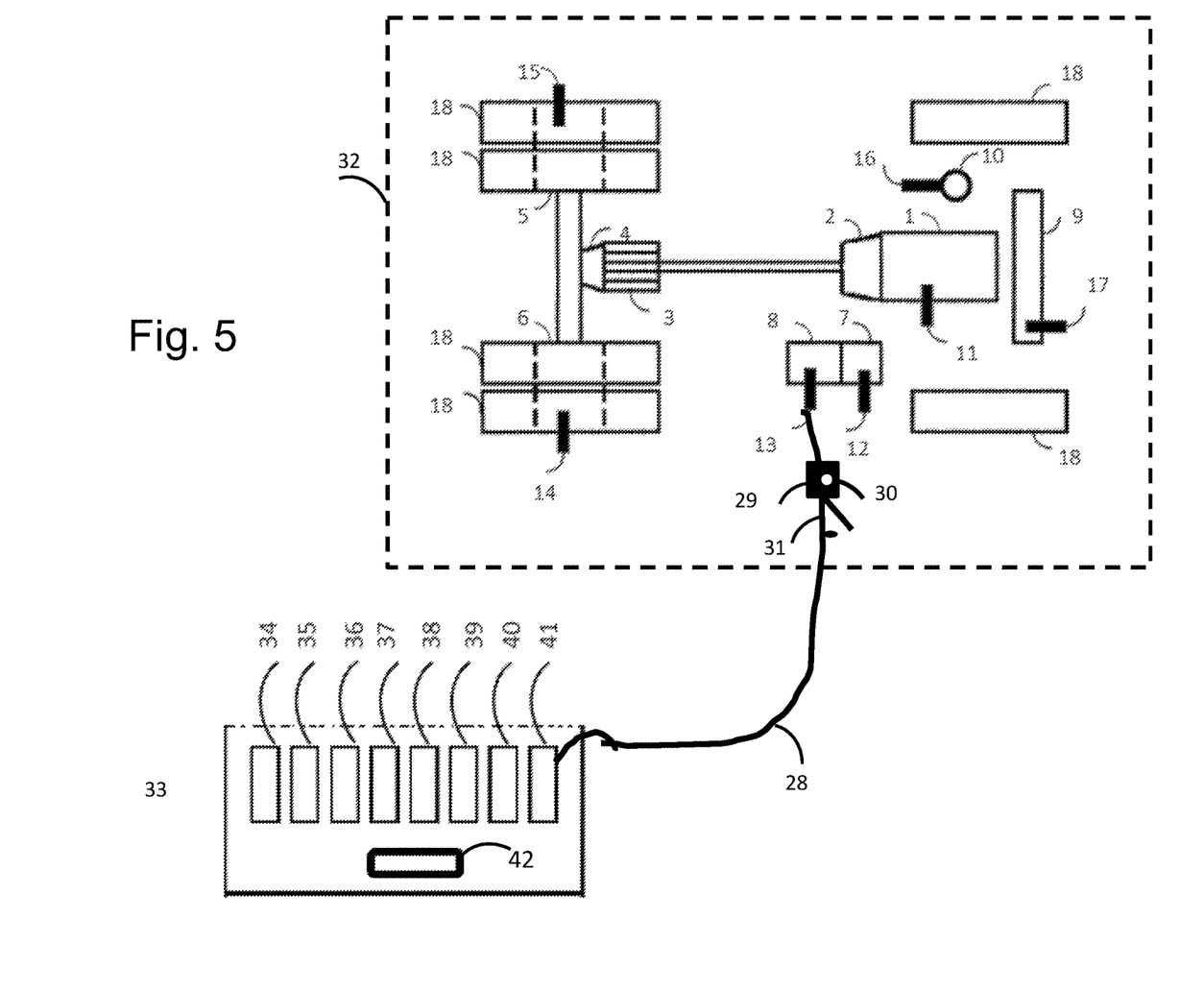
FIG. 5 illustrates a lube bay servicing a heavy machine at the workshop.
Figure 6:
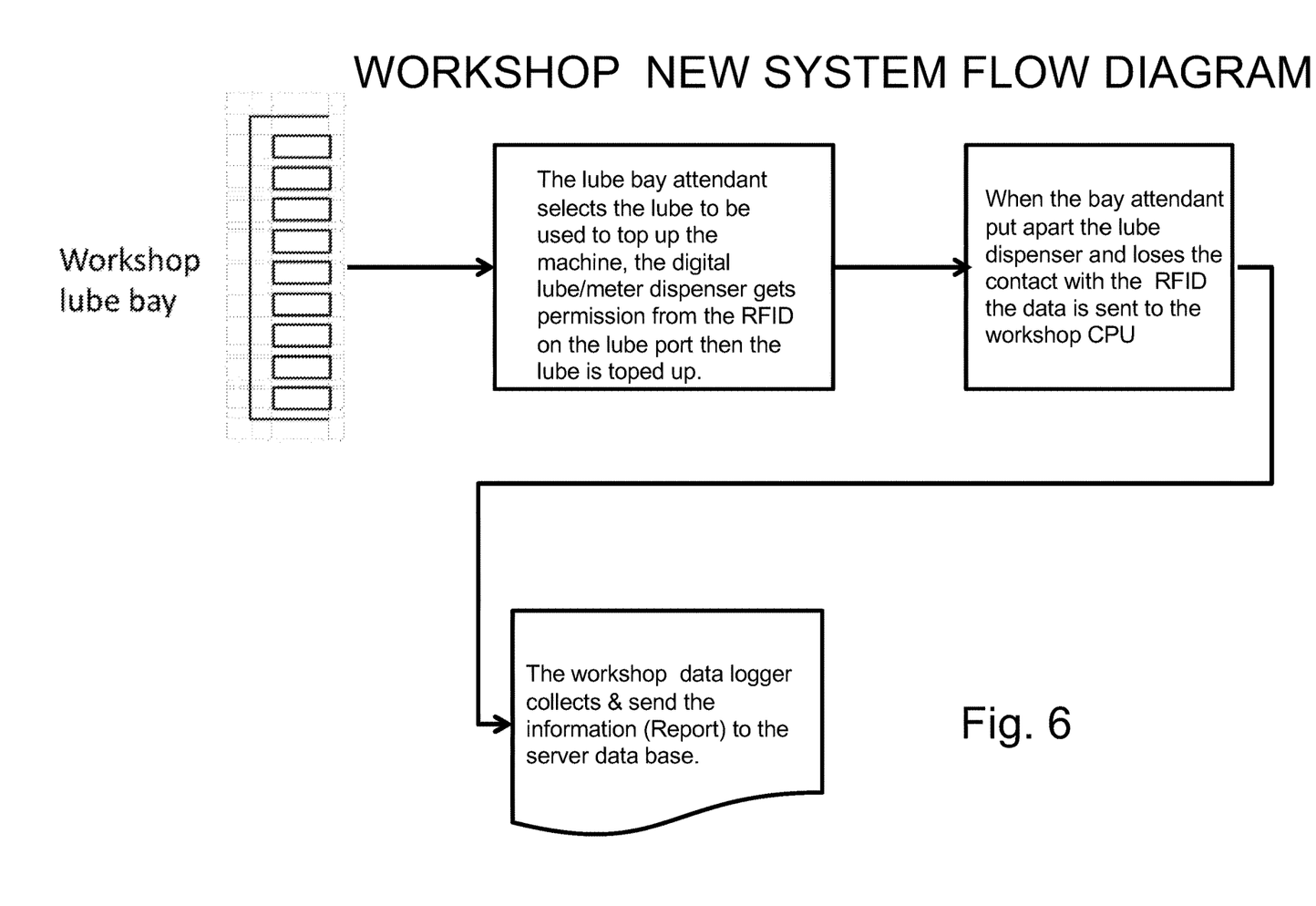
FIG. 6 shows a process flow for a lube bay at workshop using the system according to the present invention.

The process of the invention as indicated in FIG. 4 for the field and FIG. 6 for the workshop works with the installation of one passive RFID on each lube port of the heavy machinery. The passive RFID on the lube ports provides the information of Machine identifying number (TAG) and lube type. Each digital lube meter/dispensers (29, 31) have a RFID reader (30) inside. RFID reader from the digital lube meter/dispensers for each lubricant can only read and match with the right passive RFID allowing to deliver the right lubricant on the right lube port in order to avoid human mistakes and mixing lubricants.

The digital lube meter/dispenser reports to the lube truck data logger in the field or to the lube bay data logger at the workshop the Machine identifying number, lube type, volume dispatched, date and time. This information is sent from the data logger to the server in order to create the corresponding report viewable in a spreadsheet or CSV file.

The system of the present invention tracks the budget expenditures and equipment conditions so that when heavy machines have a high lube consumption the system is used to provide a warning for early detection of a failure. Accordingly, the actions to repair and correct any deviation from normal conditions will be faster when compared to the actual manual report system (FIG. 1 and FIG. 2). This is done by specific parameters to compare the actual lube consumption versus the normal expected consumption.

Figure 7:
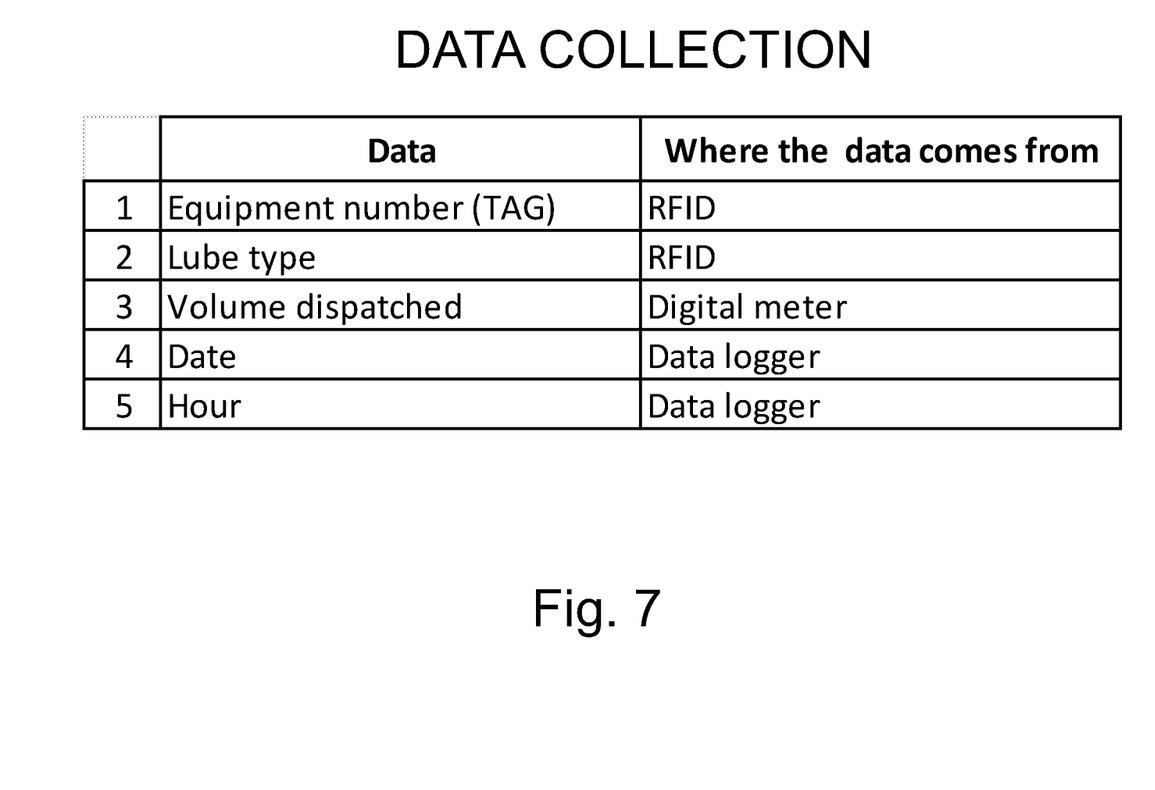
FIG. 7 shows the data collected for creating a report according to the present invention.
Figure 8:
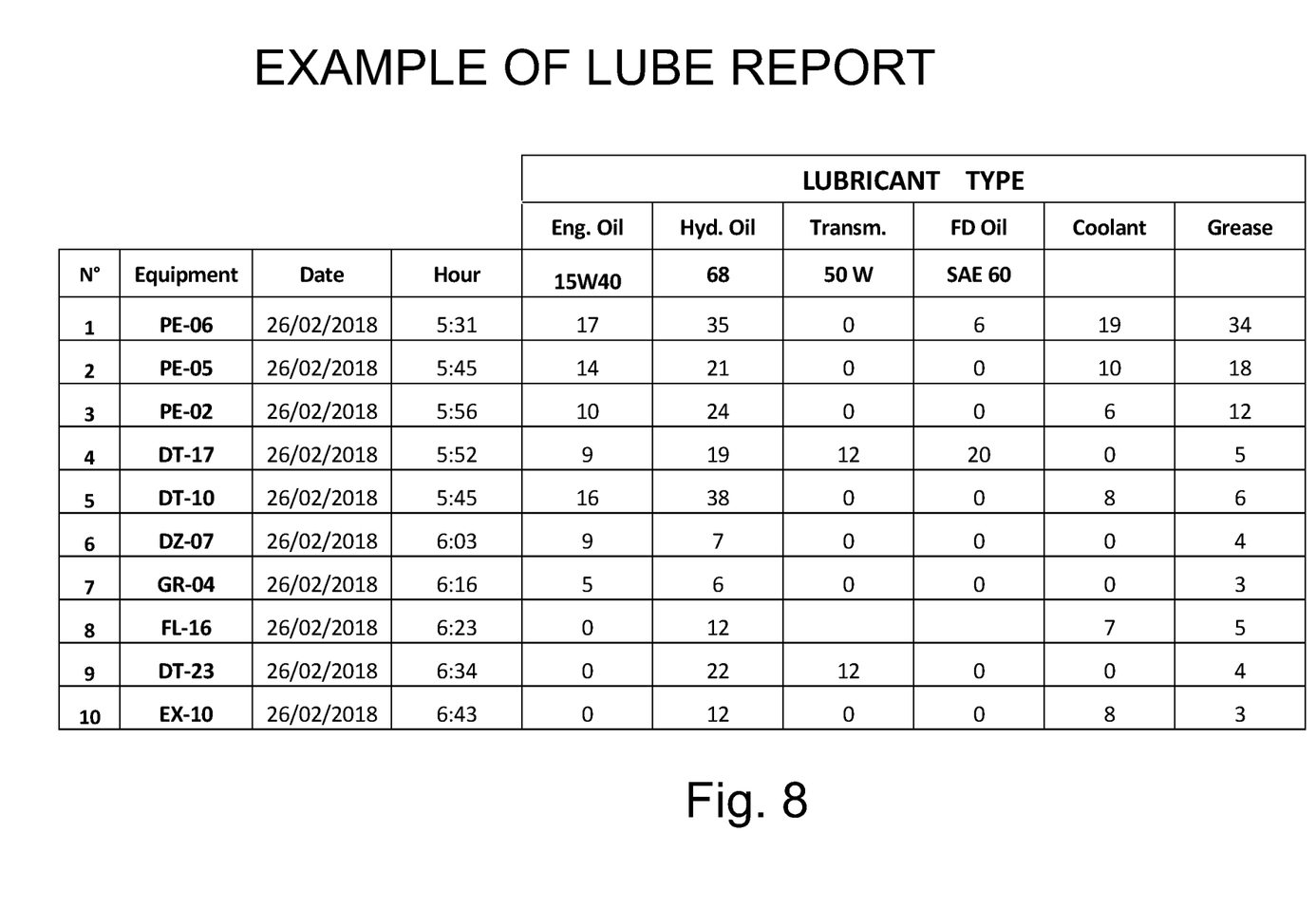
FIG. 8 shows an example of a final report according to the present invention.

Specifically, the process of the present invention begins in the same way for the lube truck and for the workshop. The digital lube meter/dispenser (29,30, 31) is selected to deliver one lubricant on the machine lube port and as the digital lube dispenser is proximate to the lube port for serving the lube, the inner RFID reader (30) gets permission from the passive RFID installed on the lube port (11,12,13,14,15,16, 17) to release the lube. By using this ID matching, the system guarantees that the right lubricants are served on the right lube port. Once the lubricant is filled, the digital lube meter/dispenser is returned to its storage position and the information about the volume delivered is sent to the data logger. The data contains the equipment identifying number (TAG), lube type, volume, date & time. After that, the data is sent from the data logger to the server to create the report. FIG. 7 indicates the source from where the data for the lube report is collected. The reports can be accessed from the server for all the authorized users, where FIG. 8 illustrates an example of a report according to an embodiment of the invention.

The information stored in data logger on the lube truck is transferred wirelessly to the server when the lube truck comes to the lube bay area to refill the lubes, preferably via a WIFI network. The use of RFID on the lube ports of the equipment linked with the RFID reader (30) guaranties the creation of an electronic report free of human mistakes.

Although the present invention has been described herein with reference to the foregoing exemplary embodiment, this embodiment does not serve to limit the scope of the present invention. Accordingly, those skilled in the art to which the present invention pertains will appreciate that various modifications are possible, without departing from the technical spirit of the present invention.

The invention claimed is:

1. A system for automatically tracking and reporting lube delivered to vehicles comprising:
    an RFID tag provided on a lube port of a vehicle, said lube port receiving a first type of lube;
    an RFID reader provided on at least one of a lube dispenser and a lube meter, wherein said RFID reader is uniquely associated to said RFID tag so that said RFID receiver receives data from said RFID tag only when said RFID receiver is in proximity to said RFID tag;
    a data logger receiving data sent from said RFID reader; and
    a server receiving data sent from said data logger, wherein a report is provided based on the data received at the server.

2. The system of claim 1, further allowing dispensing said first type of lube to said lube port only if said RFID tag is matched to said RFID reader.

3. The system of claim 1, wherein the data provided from said RFID tag includes a vehicle identifying number and said first type of lube.

4. The system of claim 1, wherein said RFID reader is provided inside said at least one of said lube dispenser and said lube meter.

5. The system of claim 1, wherein said data logger is provided on a lube bay at a workshop.

6. The system of claim 1, wherein the data sent by said RFID reader includes said vehicle identifying number, said first type of lube, a volume dispatched to said lube port, a date and time when said lube was dispatched.

7. The system of claim 1, wherein data about a volume of said first type of lube dispatched is sent from said RFID receiver to said data logger when said RFID receiver is not in proximity to said RFID tag once the dispatch of said first type of lube is completed.

8. The system of claim 1, further comprising another RFID tag provided on another lube port of said vehicle, said another lube port receiving a second type of lube different from said first type of lube, wherein another RFID reader is provided on at least one of another lube dispenser and another lube meter, said another RFID reader is uniquely associated to said another RFID tag so that said another RFID receiver receives data from said another RFID tag only when said another RFID receiver is in proximity to said another RFID tag.

9. The system of claim 1, wherein said data logger is provided on a lube delivery vehicle when said vehicle is on a field.

10. The system of claim 9, wherein said data logger wirelessly sends the data to said server when the lube delivery vehicle is on a workshop or returns from a field.

11. A method for automatically tracking and reporting lube delivered to vehicles, the method comprising:
   providing an RFID reader associated with a lube dispenser in proximity to an RFID tag associated with a vehicle lube port, wherein said RFID tag is uniquely associated to said RFID reader;
   allowing dispatch of a first type of lube from said lube dispenser to said lube port only when said RFID tag is matched to said RFID reader;
   sending to a data logger data from said RFID reader;
   sending to a server data from said data logger; and
   generating a report based on the data received on said server.

12. The method of claim 11, wherein data of said RFID tag includes a vehicle identifying number and said first type of lube.

13. The method of claim 11, wherein said RFID reader is provided inside said lube dispenser.

14. The method of claim 11, wherein said data logger is provided on a lube bay at a workshop.

15. The method of claim 11, wherein the data sent by said RFID reader includes a vehicle identifying number, said first type of lube, a volume dispatched to said lube port, a date and time when said lube was dispatched.

16. The method of claim 11, wherein data about a volume of said first type of lube dispatched is sent from said RFID receiver to said data logger when said RFID receiver is not in proximity to said RFID tag once the dispatch of said first type of lube is completed.

17. The method of claim 11, wherein said data logger is provided on a lube delivery vehicle when said vehicle is on a field.

18. The method of claim 17, wherein said data logger wirelessly sends the data to said server when the lube delivery vehicle is on a workshop or returns from a field.

19. The method of claim 11, further comprising: providing another RFID tag on another lube port of said vehicle, said another lube port receiving a second type of lube different from said first type of lube, wherein another RFID reader is provided on another lube dispenser, said another RFID reader is uniquely associated to said another RFID tag so that said another RFID receiver receives data from said another RFID tag only when said another RFID receiver is in proximity to said another RFID tag.

20. The method of claim 19, wherein data of said another RFID tag includes a vehicle identifying number and said second type of lube.

\* \* \* \* \*